United States Patent [19]

Scarola et al.

[11] Patent Number: 5,443,652
[45] Date of Patent: Aug. 22, 1995

[54] METHOD AND APPARATUS FOR CLEANING CONTAMINANTS FROM PLASTICS

[75] Inventors: Leonard S. Scarola, Union; Ernest H. Roberts, Somerset; Kenneth E. Hobbs, Helmetta; Richard G. Angell, Jr., Bridgewater, all of N.J.

[73] Assignee: Union Carbide Chemicals & Plastics Technology Corporation, Danbury, Conn.

[21] Appl. No.: 189,127

[22] Filed: Jan. 31, 1994

Related U.S. Application Data

[63] Continuation-in-part of Ser. No. 85,754, Jun. 30, 1993, abandoned.

[51] Int. Cl.6 .................................................. B08B 3/00
[52] U.S. Cl. ........................................... 134/7; 134/6; 134/10; 134/25.1; 241/15; 241/DIG. 38
[58] Field of Search .................. 134/6, 7, 10, 25.1, 134/25.4, 25.5; 241/15, DIG. 38

[56] References Cited

U.S. PATENT DOCUMENTS

| | | | |
|---|---|---|---|
| 4,379,525 | 4/1983 | Nowicki et al. | 241/20 |
| 4,617,111 | 10/1986 | Grimm et al. | 209/4 |
| 4,665,816 | 3/1987 | Waters | 100/38 |
| 4,680,060 | 7/1987 | Gupta et al. | 134/26 |
| 4,760,717 | 8/1988 | Ponzielli | 68/181 R |
| 5,073,203 | 12/1991 | Al-Ghatta | 134/11 |
| 5,094,912 | 3/1992 | Deibig et al. | 428/355 |
| 5,174,316 | 12/1992 | Keller et al. | 134/104.3 |

Primary Examiner—David A. Simmons
Assistant Examiner—Sean Vincent
Attorney, Agent, or Firm—B. L. Deppenbrock

[57] ABSTRACT

A method and apparatus for the cleaning of plastic flakes to be recycled. Water is added to the plastic flakes and high shear agitator is provided so that dirt, paper and other contamination are removed from the surface of the plastic flakes. The contaminant containing water is then separated from the cleaned plastic flakes. Batch and continuous embodiments of the present invention are disclosed.

4 Claims, 4 Drawing Sheets

METHOD AND APPARATUS FOR CLEANING CONTAMINANTS FROM PLASTICS

This application is a Continuation-in-part of prior U.S. application: Ser. No. 08/085,754, Filing Date Jun. 30, 1993, now abandoned.

FIELD OF THE INVENTION

The present invention is directed to methods and apparatus for the extraction of contaminants from plastic film or flakes.

BACKGROUND OF THE INVENTION

With the enactment of recycling legislation and the use of bottle deposits to discourage litter, the amount of plastic film and bottles available for recycling is increasing rapidly. Ideally, scrap plastic could be recycled into new bottles or film product thereby saving landfill space, energy and raw materials. However, before the plastic is recycled it must be cleaned to remove any contaminants. Cleanliness of the plastic material to be recycled is a consideration, especially if the scrap plastic is to be recycled into beverage containers or other food-contact applications.

Many food-contact plastics, such as polyethylene and polyethylene terephthalate (PET), could be recycled as beverage containers if the cleanliness of the recycled plastic could be assured. In addition to dirt, paper, glue and other routinely encountered contaminants, some recycled plastics are contaminated from a previous application. Some liquids, such as motor oil, acetic acid and the like are sufficiently soluble in the polymer so as to diffuse into the outer layer of the plastic. Therefore it would be advantageous to remove a small amount of the recycled plastic to ensure that the contents of a previous container which may have diffused into the plastic are also removed from the recycled polymer.

In an attempt to address this problem, U.S. Pat. No. 5,073,203 discloses the use of supercritical carbon dioxide as a solvent to clean the surface of plastic flakes. While the supercritical fluid is an effective solvent, the method is expensive, and requires the use of an autoclave.

Accordingly, a need exists to provide inexpensive methods and apparatus to clean the surface of plastic so that it may be recycled.

SUMMARY OF THE INVENTION

The present invention provides methods and apparatus in which the high shear rates generated by the tip speed of an agitator cleans the surface of plastic to be recycled and may also abrade the surface of the plastic. By abrading the surface of the plastic, substantially all of the routine contamination (dirt, glue, paper and the like) is removed from the plastic as well as any solvent or other liquid which may have diffused into the surface layer of the plastic.

Plastic which has been cleaned by the method of the present invention may be opaque or look "cloudy" due to the abrasion of the surface. Even well known "clear" plastics such as PET may be rendered opaque by the cleaning process of the invention. The cloudiness however, is only a result of the abraded surface of the cleaned recycled plastic and when the plastic is remolded or blown into a new bottle, the recycled plastic once again becomes clear.

More specifically, the present invention comprises a method for the cleaning of plastic flakes which comprises:
 a) providing a source of plastic flakes;
 b) providing a source of water;
 c) adding the plastic flakes to the water;
 d) agitating the plastic flakes for a sufficient period of time whereby the surface of said plastic flakes becomes abraded;
 e) separating the water from the plastic flakes.

The present invention also comprises apparatus for cleaning plastic flakes, one embodiment of the invention comprises:
 a) a container having a bottom for receiving plastic flakes, contaminants and water, said container having a wall extending upwardly from said bottom;
 b) at least one shaft mounted within said container, said shaft including one or more agitators mounted radially about said shaft;
 c) the tip of the agitators positioned less than about 4.0 inches from said wall;
 d) means for rotating said rotary shaft;
 e) inlet means for introducing a water stream into said container;
 f) outlet means located substantially in the level of the bottom in the lower part of the container for removal of water and contaminants; and
 g) a normally closed gate means located substantially in the level of the bottom in the lower part of the container.

In a second embodiment of the invention, the apparatus for cleaning plastic material comprises:
 a) a container having a bottom for receiving plastic flakes, contaminants and water;
 b) said container having a wall extending upwardly from said bottom;
 c) a substantially vertical shaft capable of rotation;
 d) a substantially horizontal shaft rigidly fixed to the substantially vertical shaft;
 e) at least two substantially vertical shafts supported by said horizontal arm projected into the interior of the container;
 f) said horizontal arm engaged to the substantially vertical shafts extending into the container, such that the substantially vertical shafts may rotate within said horizontal arms;
 g) one or more agitators mounted radially about said shafts;
 h) means for rotating said substantially vertical shafts extending into the container;
 i) means for rotating the substantially vertical shaft terminating substantially near the top of said concentric walls;
 j) inlet means for introducing a water stream into said container substantially near the top of the container;
 k) outlet means located substantially in the level of the bottom in the lower part of the container for the removal of water and contaminants; and
 l) a normally closed gate means located substantially in the level of said flat bottom in the lower part of the chamber.

In a third embodiment the apparatus of the invention comprises:
 a) a container having a bottom;
 b) a peripheral wall connected to and extending generally upward from said bottom thereby providing a container suitable for holding water, plastic flakes and contaminants;

c) an outlet means located substantially in the level of said flat bottom, said outlet means in the lower part of the container for removal of water and contaminants from the container;

d) conduit to return water substantially to the top of said container;

e) means for introducing polymer flakes into a partially submerged perforated conduit in said container; and f) means for propelling the polymer flakes in said perforated conduit.

DETAILED DESCRIPTION OF THE INVENTION

The present invention is employed to clean plastic materials so that the plastic can then be recycled. Plastic film, bottles and flakes are cleaned by the method and apparatus described herein. The present invention may be performed in either continuous or batch methods. In both the batch and continuous embodiments of the invention, the apparatus employs at least one and preferably two or more agitators to create high shear forces on the surface of the plastic to thoroughly clean the surface of the plastic. Before plastic is recycled it is typically shredded to form flakes of a more uniform size. As used herein, flake is broadly defined as any plastic material which is to be cleaned by the present apparatus and methods and includes material comprised of both rigid and flexible films, as well as other plastic materials, such as bottles. The plastic flake is typically shredded to a size ranging from about 0.125 inch to about 1.5 inches, preferably from about 0.375 inch to about 0.75 inch. Although a more uniform particle size is desirable, the invention is not limited by the size of the plastic flake or the plastic flake size distribution.

Smaller plastic flakes are desirable for several reasons. First, the smaller plastic flakes are easier to process and clean due to the high surface area provided. In addition, a larger amount of the smaller plastic flakes can be cleaned in a given amount of water than the larger plastic flakes. For example, approximately from about 12 to about 15 weight percent of 1 inch plastic flakes can be suspended and cleaned, whereas from about 20 to about 30 weight percent of 0.25 inch plastic flakes can be suspended and cleaned in the batch apparatus of the invention. When plastic film is predominately provided to the apparatus, the film has been cleaned more effectively by reducing the plastic loading in the water to about 5% by weight. Without wishing to be bound by any theory, the reduction in the level of plastic film in the water allows the water to flow between the plastic and allow the agitation effects to remove the contaminants. When more rigid material is used, such as flakes obtained from shredded bottles, the plastic is unlikely to fold over upon itself thereby trapping the contamination. For economic considerations it is important to maximize the plastic loading in the water, especially if a batch process is employed.

The invention is suitable for cleaning all types of plastics including but not limited to, high density polyethylene, low density polyethylene, linear low density polyethylene, polypropylene, polyethylene terephthalate, polyvinyl chloride, polystyrene and the like.

In all embodiments of the invention, water is employed to form a continuous liquid phase, with plastic flakes distributed throughout the water by the movement of the agitator. Water is employed to remove contaminants from the plastic flakes and to carry it away from the surface of the plastic. Detergents are also helpful in preventing the contaminants from redepositing on the surface of the plastic after it has been removed. Any of the well-known detergents may be employed such as, but not limited to cationic, anionic and nonionic detergents. Commercially available detergents have been found to perform well, most preferably Oakite TM RC 23 and RC 93 available from the Oakite Chemical Company. When a detergent is employed it is preferable to heat the water to improve the efficacy of the detergent in removing contaminants from the system. The contaminated plastic flakes, water and detergent can be added either sequentially or simultaneously to the apparatus. When operating a continuous system it is preferred that the water and plastic flakes, and detergent if any, be fed simultaneously to the apparatus,.

Figure 1:
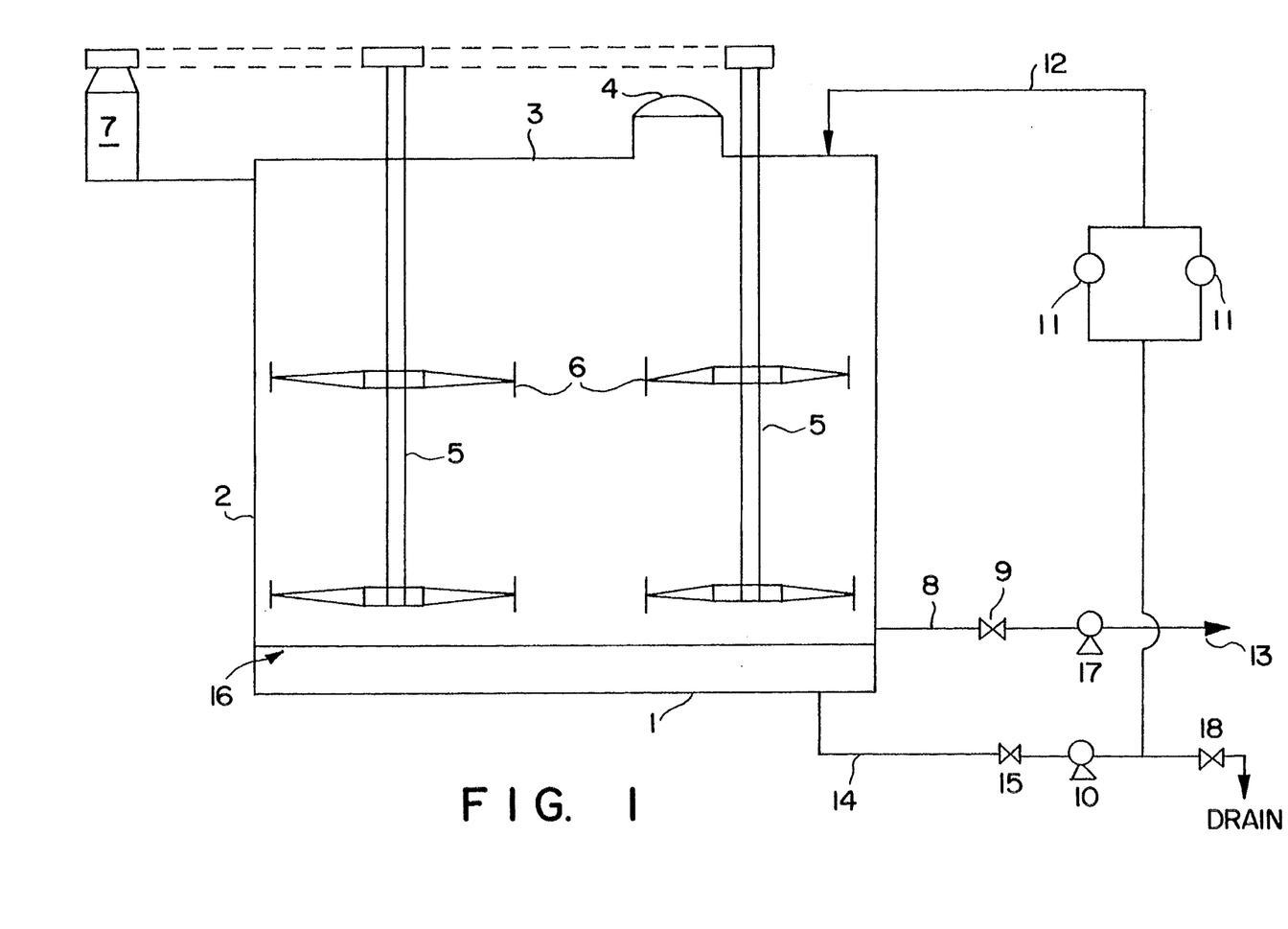
FIG. 1 is a schematic diagram of the invention which operates in a batch manner.

Referring to FIG. 1, a batch operation embodiment of the present invention is depicted, the apparatus comprising a container having a substantially flat bottom 1 and walls extruding upwardly from the bottom 2. A top 3 to the container is preferably provided to minimize spillage from the container. The plastic flakes to be cleaned are fed preferably through a trap-like opening 4 along with washing water and optionally a detergent.

The container is preferably circular in shape with a solid surface. The container is constructed of a durable surface such as carbon steel, galvanized steel and the like and in a preferred embodiment the container is stainless steel. Within said container, one or more shafts 5 are provided into the interior void volume created by the container walls. At least one, and preferably a plurality of agitators, preferably propeller-like in design 6, are fixed to the substantially vertical shafts 5. Depending on the length of the shaft, from about 6 to about 10 agitators can be used. The agitator blades should be approximately 25% of the diameter of the tank. In a preferred embodiment of the invention, the 3 to 5 pairs of agitators are pitched in paired sets at an angle so that the water and polymeric material are rotated into the confluence of the area between the agitators. The agitators are driven by one or more drive means 7, such as a motor. The motors are sufficiently sized to create a high speed mixing action of water and plastic flakes between the agitators. In this region, between the oppositely pitched agitators, the plastic flakes collide with each other at high speed which can abrade the surface of the flakes. The abrasion of the particles caused by the collision of the flakes increases the cleaning effect of the invention.

The agitators are located within the container so as to be in close proximity to the container wall. The distance between the tip of the agitator and the inside surface of the container is less than about 4.0 inches, typically from about 0.25 to about 3.0 inches, preferably from about 0.5 to about 2.0 and most preferably from about 1.0 to about 1.5 inches from the wall. Smaller distances between the wall and the tip of the agitator blade increases the level of shear created by the blade and also increases the level of abrasion created when the plastic flakes strike the wall. The closer the tip of the agitator blades are to the wall of the vessel, the more efficient the abrasion and cleaning of the plastic chips. In general, the tips should be positioned with respect to the wall of the vessel such that the shear rate is greater than 40 reciprocal seconds, preferably above 150 reciprocal seconds up to about 3000 reciprocal seconds. When multiple agitators are employed the blades tips do not overlap. When viewed from above, there is an open area which is visible between the blades. This design is beneficial in having the plastic flakes in the water contacting the wall rather than being agitated in the center of the container by the overlapping agitator blades.

The agitator blades preferably are turning at a high rate of speed so as to maximize the tip speed of the agitator blade for an agitator of a given diameter. The tip speed of the agitator is typically about 800 to about 3000 feet per minute, preferably from about 950 to about 2000 and most preferably from about 1000 to 1500 feet per minute. The high tip speed and close proximity of the agitator tip to the wall creates a high velocity and shear rate of the plastic flakes against the container wall and other plastic flakes within the system. This high shear rate will abrade the surface of the plastic thereby assuring that the contaminants have been removed from the surface of the plastic. The agitator blades are preferably operated at tip speeds which provide the desired cleaning effect while minimizing container and agitator blade wear. In a preferred embodiment, a removable liner is affixed to the container wall so as provide a replaceable part which is replaced when worn out, thereby significantly reducing or eliminating wear on the container wall.

At the lower part of the container in the annular chamber a conduit 14 is provided for discharge of the water and contaminants through a normally closed gate means 15. Water containing the contaminants is preferably recirculated through the container. A pump 10 and filtration means 11 are placed in an optional recirculation system containing a conduit 12 which returns the filtered water to substantially the top of the container. A filtering device 16, such as a screen, is located within the container to retain the plastic flake inside the container while the water is circulated through the filter and returned to the container. Preferably, the pump is sized to recirculate the entire water volume in the container from about 1 to about 10 times per minute and preferably from about 5 to about 7 times per minute. This level of recirculation ensures that any contamination that is removed from the plastic flakes is filtered out of the water and does not redeposit onto the plastic flakes.

The filtering device should contain the appropriate filtering medium to collect the paper, dirt, abraded plastic flakes and other contaminants. Various in-line filters can be used such as bucket filters, paper filters, fiber filters and the like. In a preferred embodiment, a screen is employed as the filtering media, preferably a screen of from about 50 to about 140 mesh (0.011 to 0.004 inch opening). The filter is easily cleaned, if a second standby filter is provided. This allows the operation of the filtration and recirculation apparatus even when the filter becomes dirty and requires cleaning.

An improvement in the effectiveness of the apparatus is achieved by the addition of one or more shafts to the container. Each of the shafts preferably contain multiple mixing blades to increase the level of agitation. The contact and mixing between the plastic flakes are greatly increased by the contribution of the additional shafts to the apparatus. The plastic flakes are agitated within the container for as long a period as needed to clean the plastic flakes. Generally a period of from about 3 to about 25 minutes and typically from about 5 to about 14 minutes is required to clean the plastic flake. When the recirculation of water is employed the time necessary for cleaning is greatly reduced, typically to less than 15 minutes and in most instances from about 3 to about 10 minutes and in some circumstances less than about 2 minutes is all that is required.

At the conclusion of the cleaning process, the plastic flakes can be removed from the container either from the top of the container or preferably through an optional outlet 8 and normally closed gate 9 provided substantially near the bottom of the container. The contaminant-laden water can be removed from the container through valve 18 and then the plastic flakes are flushed out of the container using clean water through the use of pump 17 making use of outlet 8 and normally closed gate 9. Alternatively the plastic flakes, contaminants and water are pumped out of the container then separated by techniques well known, such as filtration, to those with skill in the art. The clean plastic flakes are then rinsed with clean water, during or shortly after, the filtration process.

Highly agitated tanks, such as those employed in the present invention, generally cause back mixing to occur and are not suitable for continuous feed and discharge systems. Some particles could have potentially low residence times within the container. This allows some particles to pass through the washing regions of the container rapidly without adequate cleaning of the polymer particles occurring.

Figure 2:
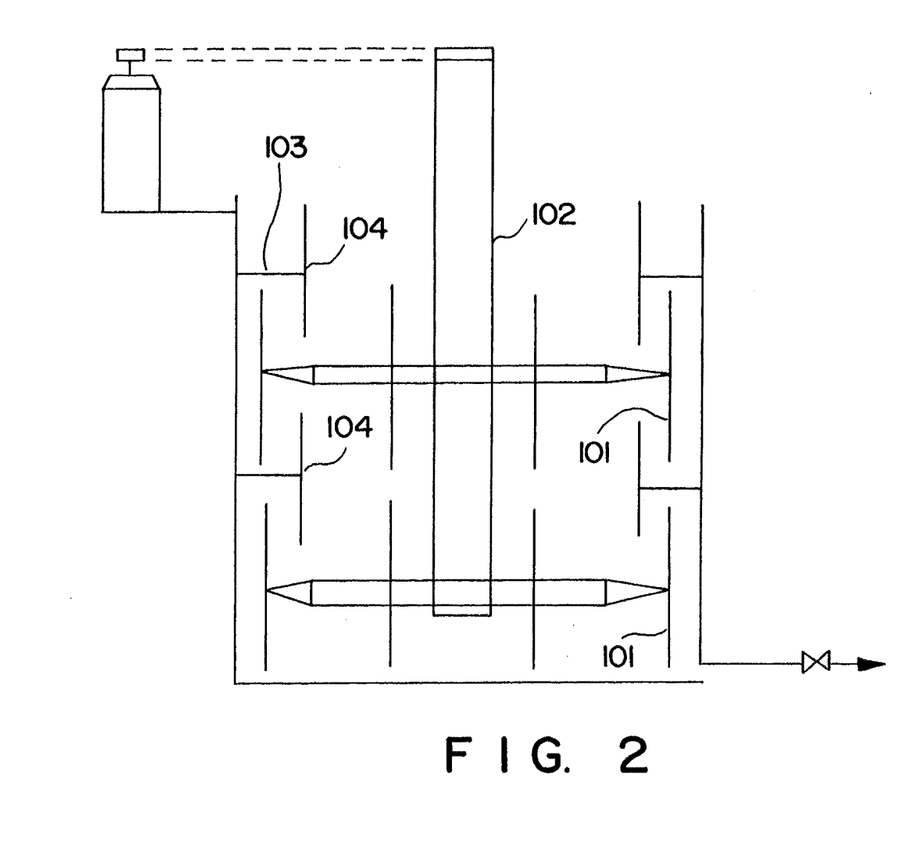
FIG. 2 is a schematic diagram of the invention which operates in a continuous manner.

In order to encourage longer residence times and more of a plug flow pattern within the container, substantially vertical plates are added to the reactor so as to segment the interior of the container into vertical channels. The segmented channels create high shear regions within the container. The plastic flakes can be highly agitated within the vertical channels without the total mixing of the container contents. Referring to FIG. 2, the agitator blades 101 attached to the shaft 102 are substantially parallel to the vertical walls of the container. Preferably the agitator blades should be of a paddle type design to maximize the effect provided by the vertical plates. Substantially perpendicular rods 103 are connected to the wall, and the rods secure substantially vertical plates 104 in place. The distance from the agitator blades to the vertical plates is preferably the same as the agitator blades to the container wall. This design creates additional shear between the substantially parallel surfaces of the wall and agitator blades and between the plates and the agitator blades.

Additionally the wall, agitator blades, and plates form vertical channels in which the water and polymer material are funneled. This positioning of the plates within the interior of the container prevents total mixing of the contents of the container while simultaneously creating high shear rates of the particles. The plates and walls of the container are preferably made of a durable, corrosion resistant surface such as steel, galvanized steel or most preferably stainless steel. A water recirculation system and plastic flake discharge system similar to that depicted in FIG. 1 is preferably employed in this apparatus (not shown for simplicity).

Table 1 contains a list of some of the parts used in the present invention to construct the apparatus depicted in FIG. 1.

| Item | Description |
| --- | --- |
| 1, 2, 3 | Carbon steel container (22-½" inch inside diameter) constructed from 55 gallon drum |
| 5 | 1.125 inch diameter shaft |
| 6 | 4 agitator propellers (6 inches in diameter) |
| 7 | 5 horsepower motor with coupling |
| 8 | 2 inch schedule 40 pipe |
| 9, 18 | 2 inch valve |
| 10, 17 | 3 horsepower slurry pump |
| 11 | filter (50 mesh screen) |
| 12, 13, 14 | 2 inch schedule 40 pipe |
| 15 | 2 inch ball valve |
| 16 | 0.25 inch screen |

Figure 3:
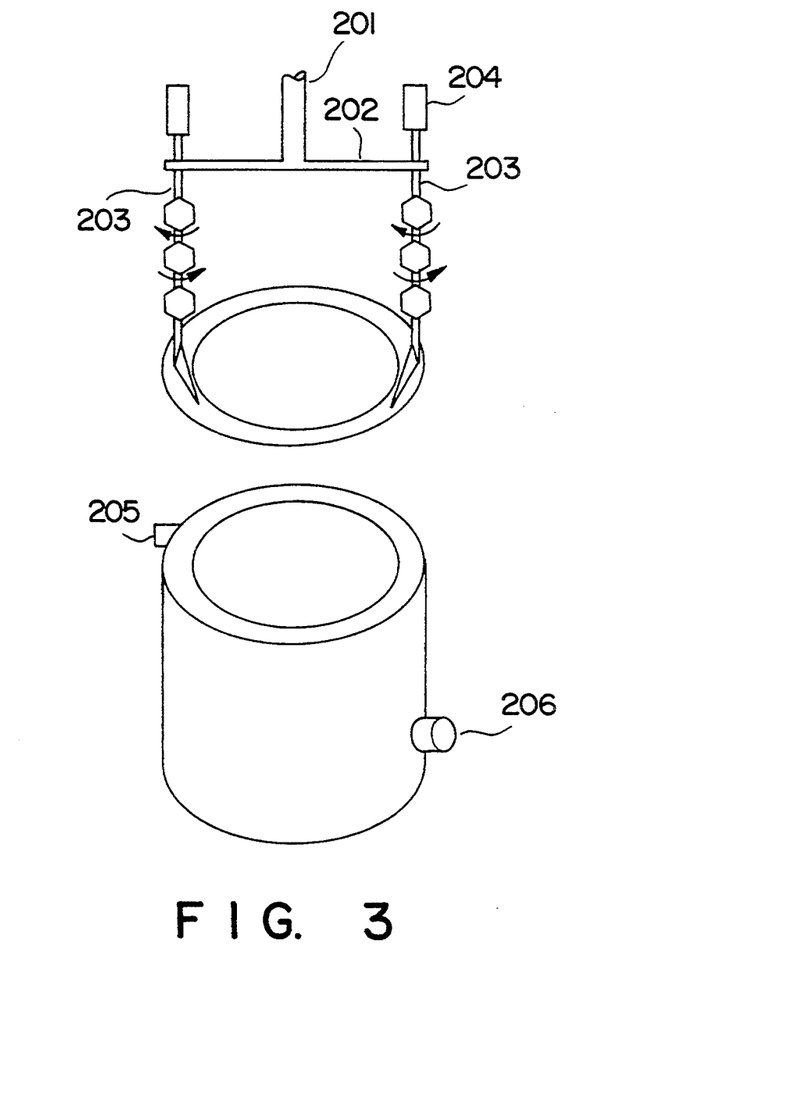
FIG. 3 is a schematic diagram of the invention which operates in a continuous manner.

Another method of developing high shear within the container while maintaining a plug flow characteristics of the plastic flakes/water solution in a substantially vertical channel in the container is depicted in FIG. 3. A rotational vertical shaft 201 is provided with a rigidly fixed substantially horizontal arm 202. The horizontal arm has at least two substantially vertical shafts 203 supported by the horizontal arm such that the shafts are free to rotate within the substantially horizontal arm. The vertical shafts within the container are provided in close proximity to the wall. Each of the substantially vertical shafts which are within the interior of the container are connected to a means, such as a motor 204, to cause the shaft to rotate. Each vertical shaft within the container may be provided with a motor or alternatively driven by a single motor. The shaft may rotate in either a clockwise or counterclockwise rotation based upon which rotation generates the most shear, thereby providing the best cleaning effect.

The vertical shaft 201 is also provided with means, such as a motor (not shown), to rotate the entire shaft. This rotation will cause the horizontal shaft to rotate substantially near the top of the above container. All of the vertical shafts within the container 203 will, therefore, also rotate.

Preferably, each horizontal arm has a pair of rotating shafts near the wall. The horizontal arm may also contain additional vertical arms so as to provide two or more pairs of rotating vertical shafts in proximity to the wall of the container. In addition, if the container is of a sufficient diameter, additional rotating substantially vertical shafts could be placed along the substantially horizontal arms.

Still referring to FIG. 3, the water and plastic material could be fed into an inlet opening substantially near the top of the container 205, the water and plastic which would then be forced into the individual rotating shafts of the horizontal arm, thereby causing a plug flow descent of the plastic flake from the inlet to the discharge 206 before reaching substantially near the bottom of the container at which time the plastic and water solution would be forced out by the rotation of the principal substantially vertical shaft. The plastic flakes are then separated from the water by filtering techniques, and then sent for further processing. This embodiment of the invention could also be employed with the rod and horizontal plate structure attached to the container wall as depicted in FIG. 2.

Figure 4:
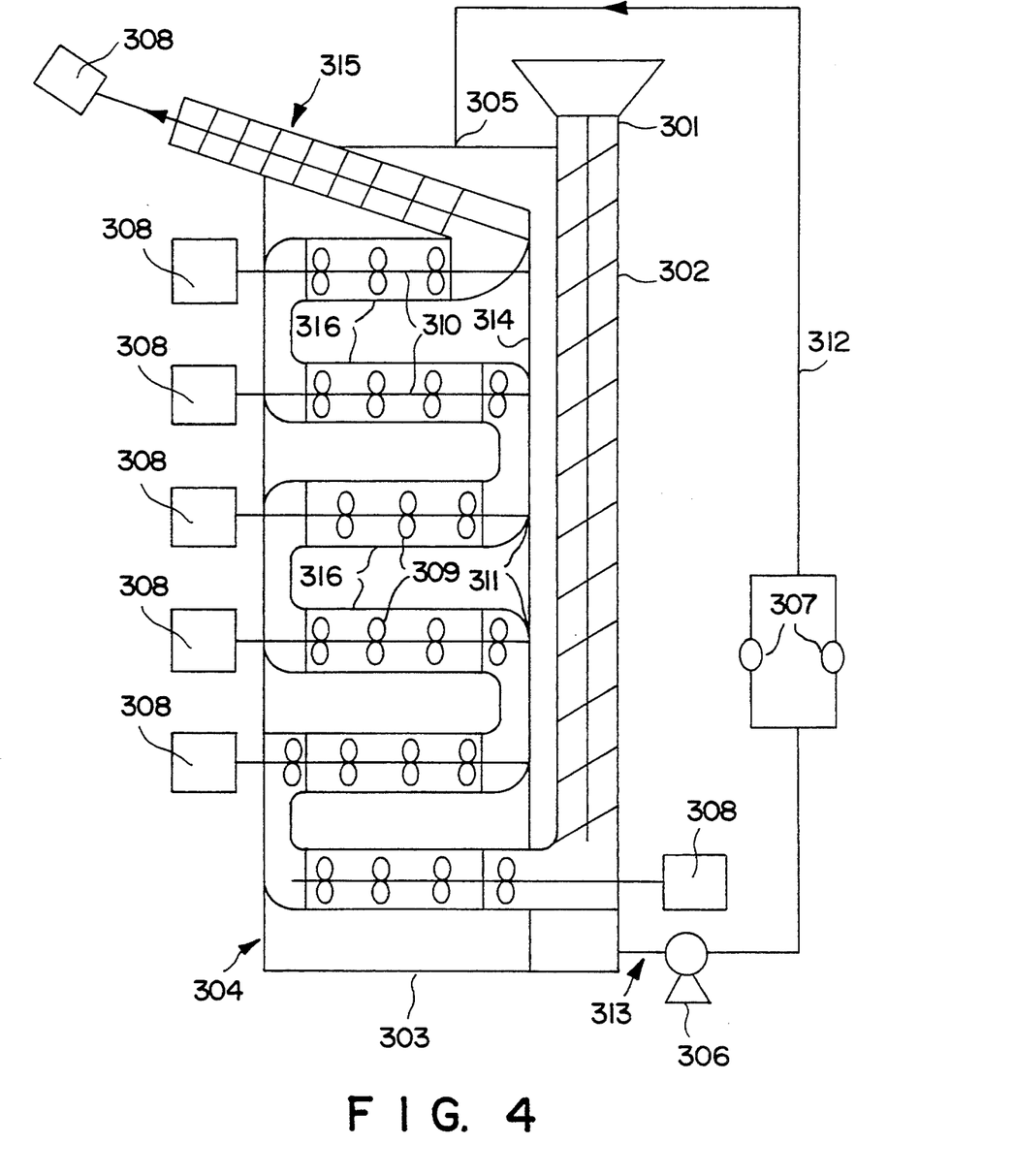
FIG. 4 is a schematic diagram of the invention which operates in a continuous manner.

Another embodiment of the apparatus for continuous cleaning of plastic material using plug flow and a higher degree of mixing is provided in FIG. 4. An auger or screw feeder is provided to feed the contaminated dry plastic flakes to be cleaned into conduit 302. The conduit contains sections in which openings are provided. The openings are large enough to allow dirt and pieces of paper to pass through while simultaneously being small enough to prevent the larger plastic material from exiting the conduit.

The portion of the conduit containing the openings in the conduit is within a container having a bottom 303 and walls 304 extending upward from the bottom. The container is constructed in such a manner so as to be suitable for containing a liquid. The container may be open at the top or may be provided with a top such that an inlet is positioned substantially near the top of the container for the recirculation of water 305. Water is provided to the top of the container or to the inlet by a pump 306. Gravity causes the water to flow to the outlet means 313 located substantially at the bottom of the container which is provided for the water to be withdrawn from the container. A pump 306, or other suitable means, then recycles the water through conduit 312 through one or more filters 307 and the clean water is then reintroduced into the container.

Still, referring to FIG. 4, dirty plastic flakes are fed into conduit 302 by a screw or feed auger 301. A motor (not shown) turns the feed auger propelling the plastic flakes within the conduit toward the bottom of the container. The conduit continues to carry the plastic flakes upward to the top of the container while remaining within the interior of the container. The direction of the conduit within the container preferably contains several substantially horizontal rows within the container. These substantially horizontal rows within the container significantly increases amount of conduit within the container. Within the container, the conduit has perforated areas 316, preferably a screen, wherein there are apertures which are smaller than the plastic flakes.

The plastic flakes are cleaned as they pass countercurrently upwards through the water filtering down through the conduit. The openings in the conduit allow water to contact the plastic flakes and rinse away the dirt while not allowing the larger plastic flakes to be washed out of the conduit. One or more motors 308 are provided to turn the screws 309 rotating upon shafts 310 provided within the annulus of the conduit which propels the plastic up to the top of container. Preferably the rotating shaft is supported by a bearing support 311 located on a wall in the container. The turning of the screw also creates a shear force to move the plastic towards the wall of the conduit which is helpful in loosing or removing contaminants from the surface. In order to move the plastic flakes upward through the conduit in a uniform manner, it is preferable to have portions of the conduit to be continuous, i.e., similar to pipe, particularly where a change of direction or significant change in height is necessary. At the top of the container it is preferable to have a second screw container 315 to remove the polymer flakes from the container.

Table 2 contains a list of some of the parts used in the present invention to construct the apparatus depicted in FIG. 4.

| Item | Description |
| --- | --- |
| 301, 302 | 48 inch in length, 4 inch diameter screw conveyor with ¼ horsepower motor |
| 303, 304 | Lexan ® container, capable of holding approximately 40 gallons |
| 305 | 2 inch inlet |
| 306 | 40 gallon per minute pump |
| 307 | filter (140 mesh screen filter) |
| 308 | 0.25 horsepower adjustable speed motors |
| 309 | stainless steel agitator approximately 0.125 inch from conduit wall |
| 310 | stainless steel shaft |
| 311 | bearing support |
| 312 | 2 inch conduit |
| 313 | 2 inch outlet means |
| 314 | support wall |
| 315 | 46 inch in length, 4 inch diameter screw conveyor |
| 316 | 3 inch in diameter stainless steel screen |

The following Examples are set forth for illustration only and are not to be construed as limitations on the present invention except as set forth in the appended claims. All parts and percentages are by weight unless otherwise specified. As used in the following Examples, flakes have been obtained from shredded plastic film, whereas chips were obtained from shredded plastic bottles.

Example 1

A 62-inch diameter stainless steel tank was equipped with a single shaft agitator. The agitator had 5 pairs of oppositely pitched agitator blades (10 agitator blades total) essentially evenly spaced along the length of the shaft. The tips of the 16-inch diameter agitators were located 1.25 inches from the tank wall. A variable speed motor was used to generate a tip speed of approximately 1500 feet/minute.

Approximately 800 pounds of polyethylene chips having a particle size of from about 0.375 inches to about 0.75 inches were added to the tank in addition to about 575 gallons of 80° C. water and 2% by volume Oakite ® RC 93 detergent. The tank contents were agitated for approximately 10 minutes. At the conclusion of the cycle the contents were pumped out and the polyethylene chips were separated from the contaminant-laden water by passing the chips over a screen. The chips were then rinsed with clean water.

Thin films produced from the cleaned polymer chips demonstrated that substantially all of the contamination had been removed from the polyethylene chips.

Example 2

A 5.5 inch diameter tank was equipped with two agitator shafts. Each agitator shaft was equipped with 5 agitator blades essentially evenly spaced within the interior of the vessel. Each agitator was approximately 1.5 inches in diameter and the agitators were located approximately 0.75 inches from the tank wall.

Approximately 150 grams of 0.375-0.50 inch PET chips, 1 liter of 95° C. water, and 2% by weight Oakite ® RC 23 were added to the tank. The contents of the tank were agitated for periods ranging from about 5 to about 10 minutes.

The addition of the second agitator resulted in higher agitation rates and shorter cleaning cycles when compared to single agitator systems previously employed in the tank.

Example 3

Equipment and process conditions similar to that described in Example 2 were employed to clean polyethylene film. The polyethylene film was shredded to create approximately 0.50 inch by 0.50 inch flakes. Forty grams of film were cleaned in two separate experiments, the first trial without water recirculation, the second trial employed water recirculation. The water was filtered through a 140 mesh screen and the liquid contents of the tank were recirculated approximately 5 times per minute.

Without recirculation, after approximately 5 minutes of cleaning in the apparatus, the polyethylene flake, while much cleaner than when added to the vessel still required additional cleaning.

With recirculation and with approximately 1 minute of cleaning time, the polyethylene flake was found to be substantially clean of all dirt.

This Example demonstrates the substantial improvement recirculation and filtration of the water has on reducing the cycle time necessary to clean the plastic.

Example 4

The apparatus depicted in FIG. 4 and described in Table 2 was employed to clean polyethylene flake.

The apparatus processed approximately 20 pounds per hour of polyethylene while recirculating 25 gallons of water per minute The apparatus was found to be particularly well suited for handling polyethylene flake due to the extremely high water recirculation rate and multiple cleaning areas, i.e, the screen conduit, water was able to flow between the plastic flakes and remove the contaminants.

Example 5

In order to further quantify the effects multiple agitators have on the present invention, the apparatus of Example 2 was operated with one and two agitators. Polyethylene chips were cleaned in the apparatus for various periods of time and polyethylene chips were pressed into plaques.

The color of the plaques was measured using a Hunter ® colorimeter, a D65 illuminant, a 1964 10° standard observer, with 45° illumination with 0° viewing with a white tile back. The Hunter ® colorimeter values X, Y, Z were converted into a C.I.E. value using the following formula:

$$C.I.E. = 2Z - X + \frac{Z - Y}{Y - X}$$

Higher C.I.E. color values are indicative of improving color.

The following results were obtained:

| Time (Minutes) | C.I.E. VALUE | |
| --- | --- | --- |
|  | 1 Shaft | 2 Shafts |
| 2 | 39.70 | 39.27 |
| 4 | 43.31 | 46.47 |
| 6 | 45.47 | 49.62 |
| 10 | 46.30 | 49.89* |

*average of two values

The above results demonstrate that the multiple shaft design is preferable to the single shaft inasmuch as the polymer is cleaned more rapidly. Between 6 and 10 minutes, the 2 shaft apparatus did not markedly improve the polymer color. It is believed that a maximum value can be achieved by either design, and additional cleaning time beyond a given color value does not significantly improve polymer cleanliness. Furthermore it is believed that the single shaft design would approach the C.I.E. values of 49.5 or greater produced by the two shaft apparatus had the single shaft design been allowed to operate for a longer period of time.

EXAMPLE 6

A 23.5 inch diameter by 27 inch tall clear acrylic tank contained 200 pounds of water and 80 pounds of polyethylene detergent bottle chips. A rotating shaft driven by a 0.75 horsepower electric motor turned the shaft at 790 RPM. The shaft contained four propellers, each containing five blades and each 6.5 inches in diameter. The distance between the tip of the propellers and the wall of the vessel was 1.25 inches. High shear rates are desired in generating motion between particles and causing dirt and surface contamination to be removed. The shear rate was calculated by dividing the velocity difference across a space by the length of that space. In this example, Shear Rate=propeller tip speed minus velocity at the vessel wall all divided by the distance of the propeller tip from the wall. The shear rate of this example was tip speed of 268.8 inches per second minus zero velocity at the wall all divided by 1.25 inches and equaled 215 reciprocal seconds.

When the propeller is 0.25 inches from the wall the shear rate is 1075 reciprocal seconds. The chips are very clean in both of these propeller-to-wall distances.

When this propeller is at the middle of this 23.5 inch tank the shear rate is 32 reciprocal seconds and the cleaning of the chips is poor, relative to the results obtained with the propeller close to the wall. In contrast, the propeller in U.S. Pat. No. 4,379,525 (Column 7, lines 17–45), by Nowicki produces a shear rate of less than 7 reciprocal seconds.

We claim:

1. Method for cleaning plastic flakes comprising:
   a) providing a source of plastic flakes;
   b) providing a source of water;
   c) combining the plastic flakes and the water;
   d) agitating the plastic flakes and water such that the mixture has a shear rate greater than 40 reciprocal seconds whereby the surface of said plastic flakes becomes abraded; and
   e) separating the water from the plastic flakes.

2. The method of claim 1 wherein the agitation of the plastic flakes and water is performed by an agitator with a tip speed of about 800 to about 3000 feet/minute.

3. The method of claim 2 wherein the water source is continuously recirculated while the water and plastic flakes is agitated.

4. The method of claim 3 wherein the continuously recirculated water is filtered of contaminants while the water and plastic flakes is agitated.

* * * * *